United States Patent
Gonzalez et al.

(10) Patent No.: US 11,149,685 B2
(45) Date of Patent: Oct. 19, 2021

(54) MODIFIED ACOUSTIC SECONDARY NOZZLE

(71) Applicant: SAFRAN AIRCRAFT ENGINES, Paris (FR)

(72) Inventors: Jérémy Paul Francisco Gonzalez, Moissy-Cramayel (FR); Guillaume Bodard, Moissy-Cramayel (FR); Norman Bruno André Jodet, Moissy-Cramayel (FR); Jacky Novi Mardjono, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 15 days.

(21) Appl. No.: 16/640,198

(22) PCT Filed: Aug. 21, 2018

(86) PCT No.: PCT/FR2018/052088
§ 371 (c)(1),
(2) Date: Feb. 19, 2020

(87) PCT Pub. No.: WO2019/038503
PCT Pub. Date: Feb. 28, 2019

(65) Prior Publication Data
US 2020/0173396 A1    Jun. 4, 2020

(30) Foreign Application Priority Data
Aug. 21, 2017    (FR) ..................... 1757776

(51) Int. Cl.
*F02K 1/46*    (2006.01)
*F02K 3/04*    (2006.01)

(52) U.S. Cl.
CPC . *F02K 1/46* (2013.01); *F02K 3/04* (2013.01)

(58) Field of Classification Search
CPC ... F02K 1/36; F02K 1/386; F02K 1/38; F02K 1/44; F02K 1/48; F02K 1/52; F02K 1/46
See application file for complete search history.

(56) References Cited

U.S. PATENT DOCUMENTS

| | | | |
|---|---|---|---|
| 6,082,635 A | 7/2000 | Seiner et al. | |
| 7,735,601 B1 * | 6/2010 | Stieger | F02K 1/48 |
| | | | 181/213 |

(Continued)

FOREIGN PATENT DOCUMENTS

FR    1 505 556 A    12/1967

OTHER PUBLICATIONS

International Search Report for PCT/FR2018/052088 dated Dec. 20, 2018 [PCT/ISA/210].

(Continued)

*Primary Examiner* — Gerald L Sung
(74) *Attorney, Agent, or Firm* — Sughrue Mion, PLLC

(57) ABSTRACT

An assembly for the rear of a bypass turbomachine (10) comprises a primary nozzle (11) comprising a trailing edge defining a primary flow path portion and a secondary nozzle (110) defining a secondary flow path portion, defined about a longitudinal axis (X), said secondary nozzle being configured to eject a mixture of the flows coming from a secondary flow path (Vs) and from a primary flow path (Vp) of the turbomachine (10), the secondary nozzle being of convergent-divergent shape with a throat (112) corresponding to a minimum cross section of the nozzle (110), the secondary nozzle (110) comprising, at the throat (112), a periodic succession of lobes (116, 118) which are situated along the internal circumference of the secondary nozzle (110). The assembly also comprises a lobed mixer (130) at the downstream end of the primary nozzle (11), this having an alternation of hot lobes (134) extending inside the secondary flow path and of cold lobes (132) extending inside (Continued)

the primary flow path. The lobes of the nozzle (110) which are concave (118), which is to say radially towards the outside, and respectively which are convex (116), which is to say radically towards the inside, if the longitudinal offset is disregarded, radically face the respectively hot lobes (134) and cold lobes (132) of the mixer (130).

11 Claims, 5 Drawing Sheets

(56) References Cited

U.S. PATENT DOCUMENTS

| | | |
|---|---|---|
| 2010/0170261 A1 | 7/2010 | Stieger et al. |
| 2013/0239576 A1 | 9/2013 | Kupratis et al. |

OTHER PUBLICATIONS

French Search Report dated Apr. 24, 2018, from the French National Industrial Property Institute in Application No. 1757776.

\* cited by examiner

MODIFIED ACOUSTIC SECONDARY NOZZLE

GENERAL TECHNICAL FIELD

The present invention relates to the field of noise reduction for a mixed-flow turbomachine. It concerns more particularly the afterbody of a turbojet engine with a mixer, where the primary flow at the outlet of the engine and the secondary flow mix inside a nozzle called secondary nozzle, to form a jet propelled in the outside air.

The field of the concerned turbomachines thus relates to LDMF (long duct mixed-flow) nozzles, that is to say a secondary nozzle extending beyond the mixture of the flows.

The invention particularly concerns the solutions provided to the acoustic problems in the context of secondary nozzle called convergent-divergent secondary nozzle.

STATE OF THE ART

In the context of nozzles called convergent-divergent nozzles, a source of noise comes from the fact that a Mach pocket is present at the throat of the nozzle.

Indeed, the interaction between the turbulence resulting from the mixture of the two flows and the supersonic flow areas in the nozzle is a source of high-frequency noise. This phenomenon can appear in particular when the nozzle begins to prime.

This phenomenon is more clearly observed when a lobed mixer is installed at the confluence of the primary and secondary flows. Reference is made to the applications FR2902469 or EP1870588 for the mixers, as well as to the document WO2015/036684 which proposes a solution using chevrons located on the trailing edge of the nozzle.

However, the present invention takes place in the context of nozzles called convergent-divergent nozzles. These allow improving the performances of mixed-flow nozzles, in particular by increasing the size of the convergent-divergent (ratio called "CVDC" and conventionally referenced A9/A8—see FIG. 1 which illustrates a nozzle 110, a trailing edge 114 and a throat 112 and the respective sections $S_t/S_c$). A convergent-divergent nozzle, by definition, has a minimum section whose axial positioning does not coincide with one of the ends of the duct. The use of a secondary convergent-divergent nozzle has two advantages: it allows significantly modifying the flow rate coefficient with low expansion ratio and improving the performance of the nozzle. This increase is beneficial for the performance of the engine but is acoustically disadvantageous.

As indicated above, the appearance of a Mach pocket is observed at the throat (see FIG. 2, where the two curves represent the noise, with mixer in solid line, and without mixer in dotted line—on the abscissa the frequency F, and on the ordinate the sound pressure level SPL, in decibel). The turbulences derived from the mixture of the two flows and the Mach pocket cause the appearance of unwanted noises.

PRESENTATION OF THE INVENTION

The invention aims at reducing the aforementioned acoustic consequences, in the context of convergent-divergent nozzle with mixer.

To this purpose, the invention proposes a secondary nozzle for a double-flow turbomachine, defined about a longitudinal axis, said nozzle being configured to eject a mixture of the flows derived from a secondary flowpath and a primary flowpath of the turbomachine, the secondary nozzle being of the convergent-divergent shape with a throat corresponding to a minimum section of the nozzle, wherein the secondary nozzle comprises, at the throat, a periodic succession of lobes located along the inner circumference bf the secondary nozzle.

The invention may comprise the following characteristics, taken alone or in combination:

- the periodic succession is such that the section of the nozzle at the throat is the smallest section of the nozzle,
- the radius at the trailing edge is greater than the maximum radius at the throat,
- the average radius of the nozzle in the section at the throat corresponds to the equivalent radius of an equivalent circular section, so that the section of the nozzle at the throat is the smallest section of the nozzle,
- each lobe extends axially over part of the secondary nozzle by a certain distance upstream and/or downstream of the throat, preferably downstream to the trailing edge of the nozzle,
- said certain distance is smaller than once the average diameter of the nozzle at the throat,
- in sections orthogonal to the longitudinal axis the amplitude of the lobes between successive sections along the upstream and/or down ream direction of the throat gradually decreases until reaching zero,
- the periodic succession of lobes is defined, at least on a portion of the inner circumference, preferably more than 75% of the inner circumference, by the following equation:

$$R(x,\theta)=R_{ref}(x)+L(x)\cdot\cos(N,\theta)$$

and $$\pi R^2_{ref}(x_{throat})=\pi\int_0^{2\pi}R^2(x_{throat},\theta)d\theta$$

where R is the radius of the secondary nozzle as a function of the circumferential position and of the abscissa along the longitudinal axis of the nozzle, $x_{throat}$ is the abscissa of the throat, $R_{ref}$ is the radius of a circular reference section, L is an amplitude function depending on the abscissa, N is the number of periods,

- the lobes are formed directly in the material of the nozzle,
- the ratio between the section at the trailing edge of the secondary nozzle and the section at the throat of the secondary nozzle is comprised between 1 and 1.05.

The invention also concerns an assembly for the rear of a turbomachine with a longitudinal axis, comprising:

- a secondary nozzle as defined above, defining a secondary flowpath portion,
- a primary nozzle, comprising a trailing edge and defining a primary flowpath portion,
- a lobed mixer, at the downstream end of the primary nozzle and having an alternation of hot lobes extending inside the secondary flowpath and cold lobes extending inside the primary flowpath, wherein the concave, respectively convex, lobes of the nozzle are, to within the longitudinal offset, radially facing the hot, respectively cold, lobes of the mixer.

Each apex of the mixer lobes can be radially aligned, to within the longitudinal offset, with an apex of a lobe of the nozzle.

There can be as many concave lobes as hot lobes and as many convex lobes as cold lobes.

The invention also concerns a double-flow turbomachine comprising a nozzle as described above or an assembly as described above.

PRESENTATION OF THE FIGURES

Other characteristics, objects and advantages of the invention will emerge from the following description which is purely illustrative and not limiting and which should be read in relation to the appended drawings, in which.

DETAILED DESCRIPTION

Figure 1:
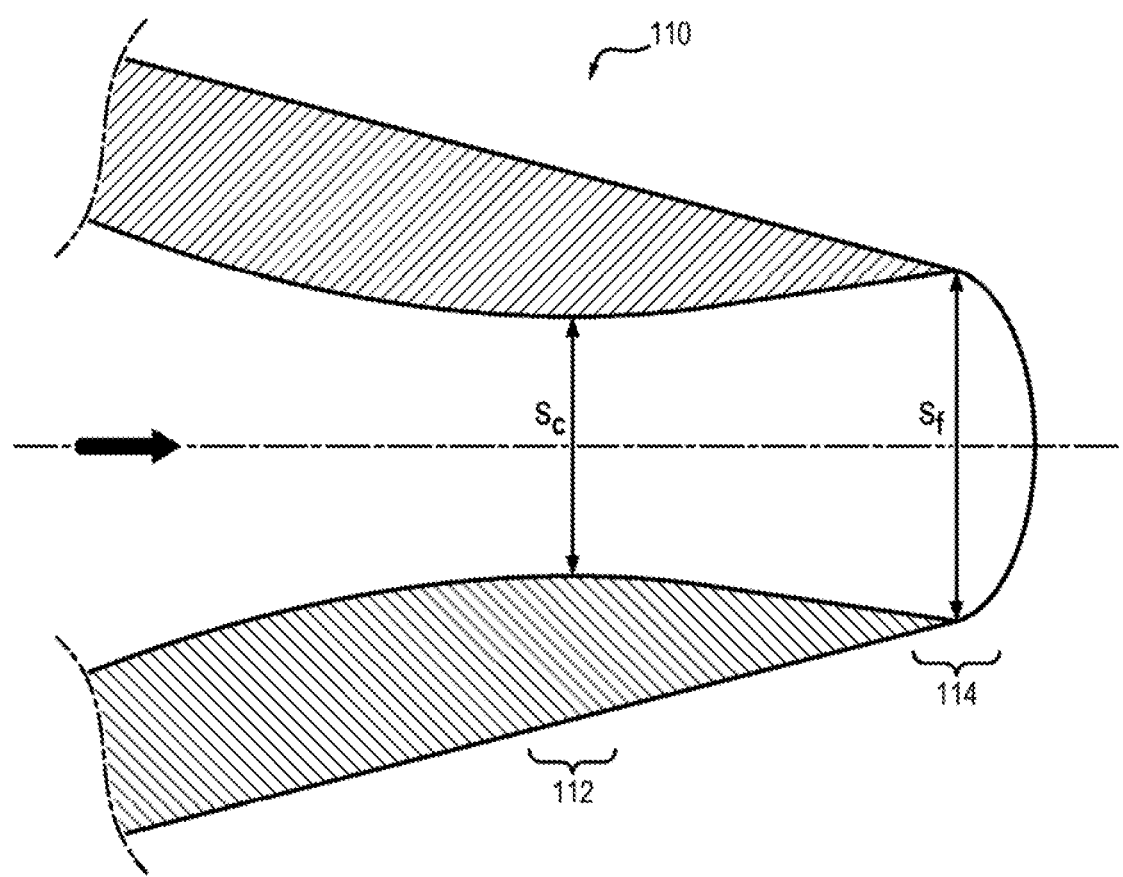
FIG. 1 illustrates the general principle of a convergent-divergent nozzle.
Figure 2:
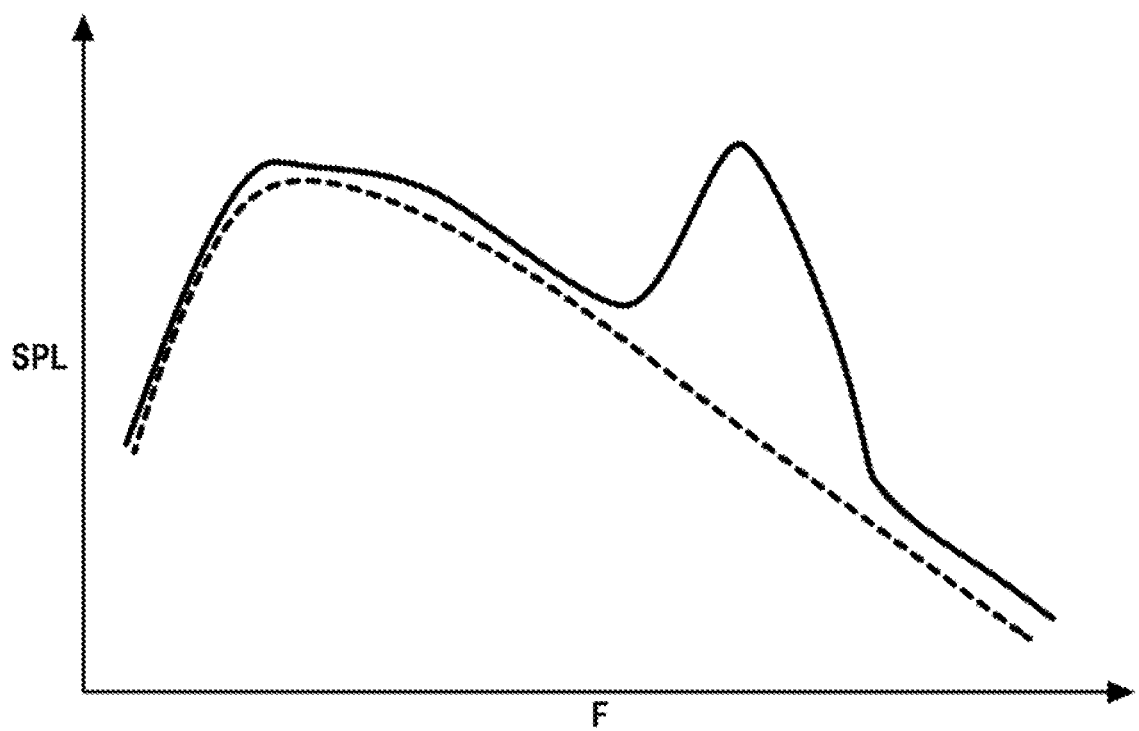
FIG. 2 illustrates noise spectra (in decibel) of a turbomachine with and without lobed mixer.

The invention will now be described in relation to FIGS. 3 to 6.

The concerned turbomachine afterbody 100 belongs to a double-flow turbomachine 10, comprising a primary flowpath Vp and a secondary flowpath Vs, Reference will be made to flowpath for the volume through which a flow circulates. The primary flow therefore circulates in the primary flowpath Vp and the secondary flow therefore circulates in the secondary flowpath Vs.

The turbomachine 10 is arranged about a longitudinal axis X, The abscissa is defined as the position along this longitudinal axis X.

Within the primary flowpath Vp, the turbomachine 10 comprises conventional elements known to those skilled in the art, such as one or several compression stage(s), a combustion chamber and finally one or several turbine stage(s), which in particular drive the compressors and also a fan, which allows supplying the secondary flowpath Vs and provides most of the thrust. At the downstream end, the primary flowpath Vp is defined by a primary nozzle 11, which allows the ejection of the primary flow. The primary nozzle 11 can be formed from several separate parts.

Likewise, within the secondary flowpath Vs, the turbomachine 10 integrates conventional elements known to those skilled in the art. Particularly, at the downstream end, the secondary flowpath is defined by a nozzle 110, called secondary nozzle. In the case of LDMF turbomachines, it extends downstream beyond the primary nozzle 11. Consequently, the secondary nozzle 110 ejects the secondary flow, mixed with the primary flow.

This secondary nozzle 110 is convergent-divergent. As indicated in the introduction, this means that the radius (or the diameter) of the nozzle decreases and, then increases again, in the direction of flow. The direct consequence is that the flow section decreases and then increases again.

The portion of the nozzle 110 is called "throat" 112 of the secondary nozzle, at an abscissa $x_{throat}$, where this section is minimal.

The convergence-divergence ratio is typically comprised between 100% and 105% (ratio of the section at the trailing edge 114 to the section at the throat 112: $S_t/S_c$).

The turbomachine afterbody 100 may further include a central body 12 limiting the radial extension of the primary flowpath inside the nozzle 110. This central body 12 is not concerned with the invention. It is located on the longitudinal axis X and generally stops after a trailing edge 120 of the nozzle.

The primary nozzle 11 therefore comprises a trailing edge 120, at an abscissa $x_p$ upstream of the abscissa $x_{throat}$. The central body 12, if present, extends longitudinally beyond the trailing edge 120, that is to say downstream of the abscissa $x_p$.

Figure 3:
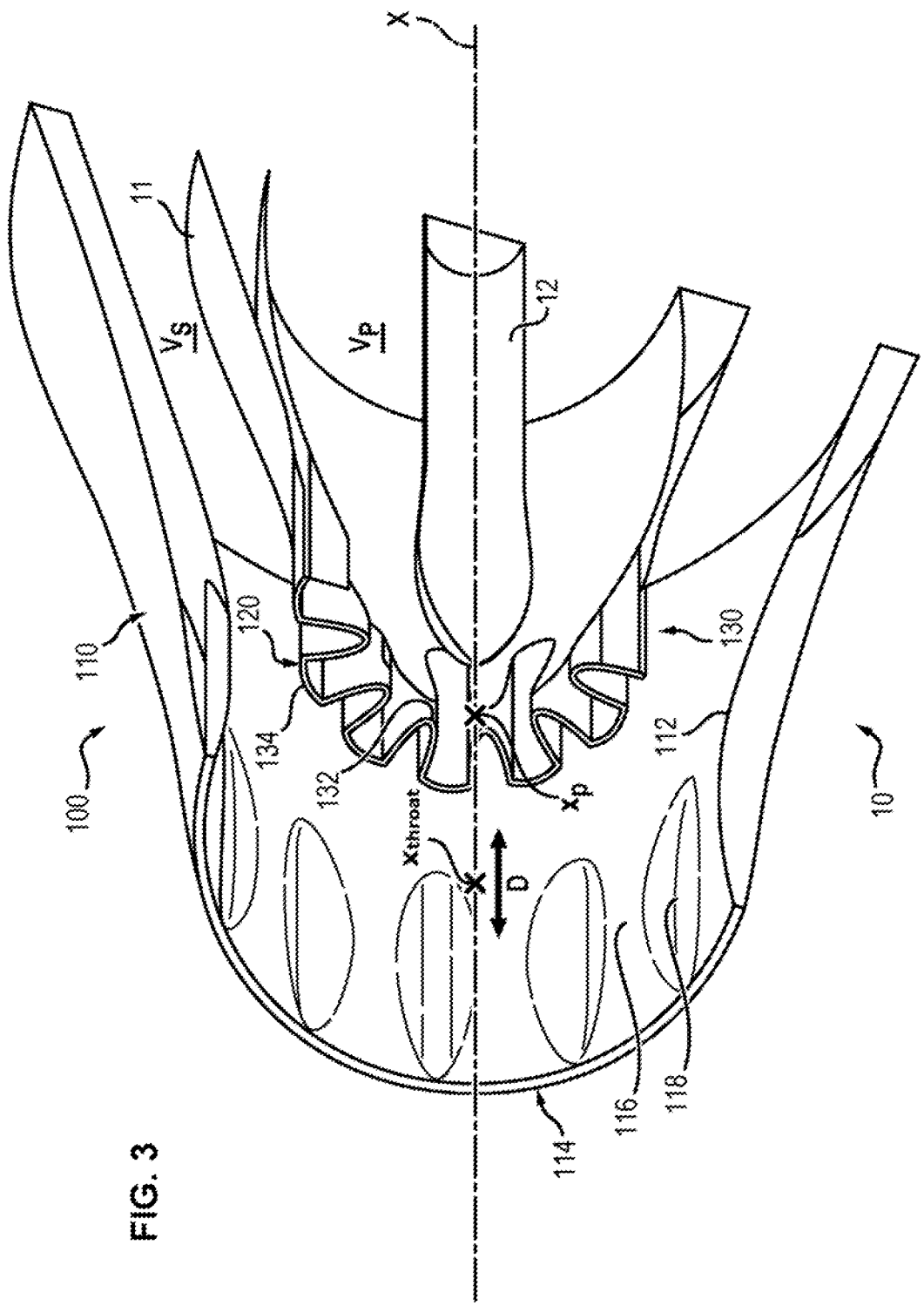
FIG. 3 illustrates in three dimensions one embodiment of the invention.
Figure 4:
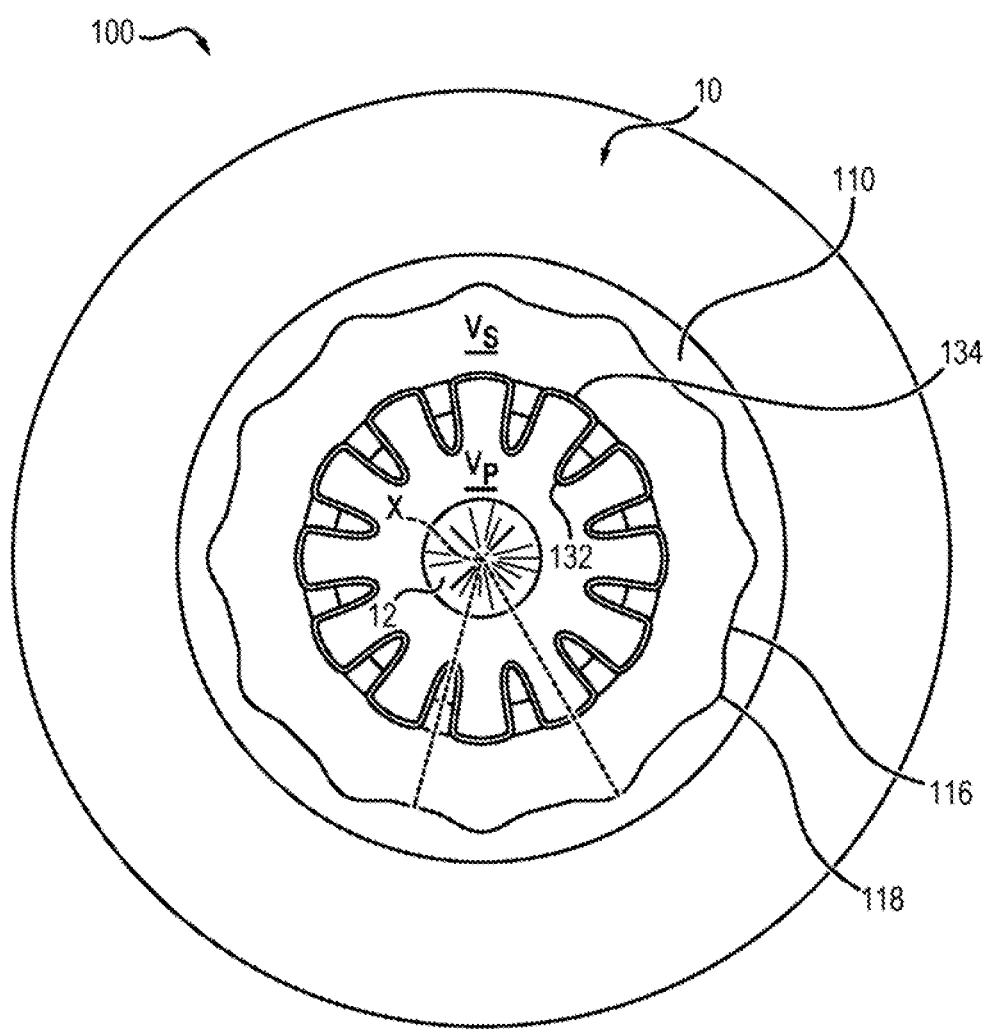
FIG. 4 illustrates, by bringing several elements in the sane plane, one embodiment of the invention.
Figure 5:
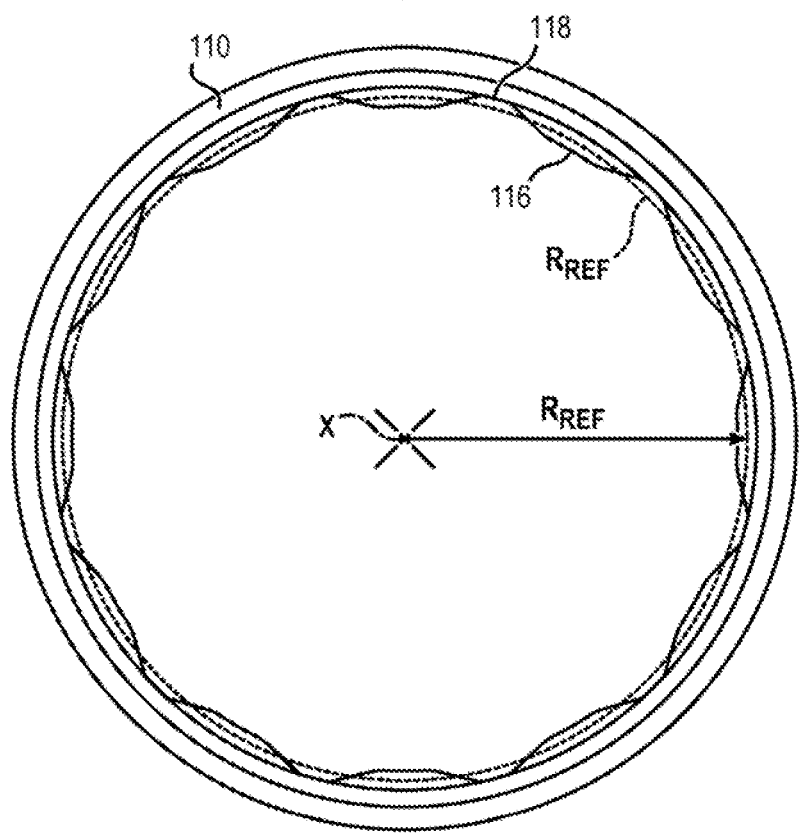
FIGS. 5 and 6 illustrate a nozzle according to the invention compared to a reference nozzle.
Figure 6:
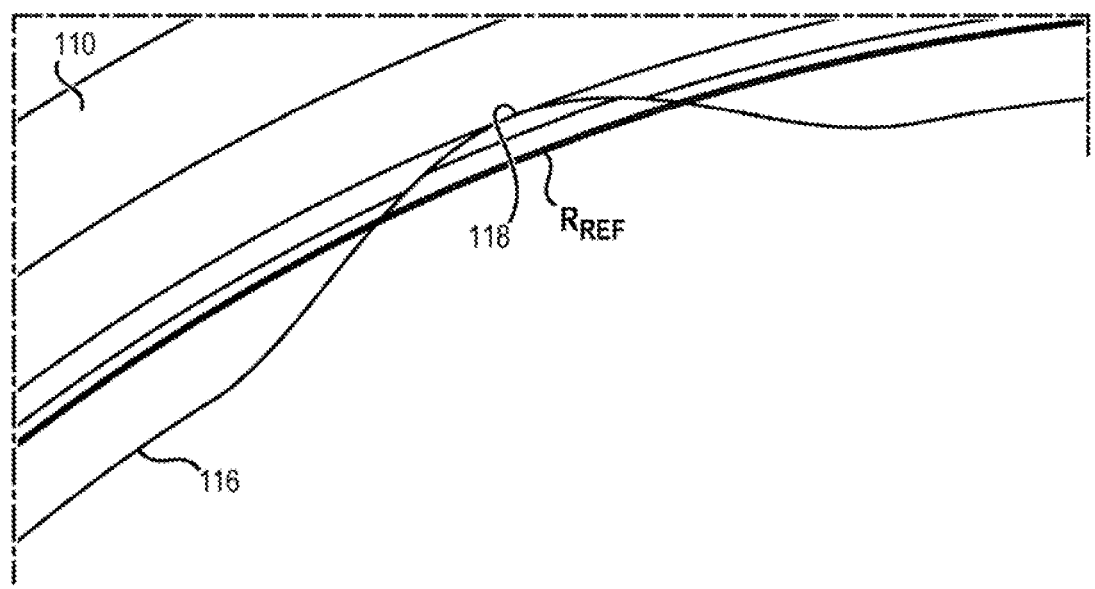

As illustrated in FIGS. 3 to 4, the primary nozzle 11 ends with a lobed mixer 130 which has the function, as indicated in the introduction, of mixing the primary and secondary flows before it is completely ejected from the secondary nozzle 110. With reference to FIG. 3, the lobed mixer 130 is a profiled part extending inside the secondary nozzle 110, the walls defining inside the primary flowpath Vp and outside the secondary flowpath Vs. The mixers may have the lobes symmetrical and periodic, or non-symmetrical and/or non-periodic. The thickness of the trailing edge of the mixer 130, coincident with the trailing edge 120 of the primary nozzle 11, is generally small to avoid a cap effect between the two flows. The lobed mixer 130 generally stops at a significant distance from the downstream end of the nozzle 110 to allow the flow mixture to homogenize. It is recalled that the invention takes place in the context of LDMF (long duct—mixed flow) turbomachines.

As seen in FIGS. 3 and 4, an exemplary embodiment of the mixer 130 is constituted with symmetrical and periodic lobes in azimuth about the longitudinal axis X. In this example, the trailing edge line 120 has an azimuthally corrugated and regular three-dimensional shape which passes periodically through a low point 132 of minimum radius and a high point 134 of maximum radius. The shape of the mixer is preferably obtained by joining this trailing edge line 120 by smooth regular surfaces, on one side to the circular section of the external wall of the primary nozzle 11, on the other side to the circular section of the internal wall of secondary flowpath Vs. Known means allow those skilled in the art to obtain these smooth surfaces by defining regular laws of radius variation for joining the inlet sections to the trailing edge 120 of the lobed mixer 130.

In the example presented, the progressions of the trailing edge 120 of the mixer 130 are periodic. In this way, the average surface between the radially outer wall and the radially inner wall of the mixer 130 makes periodic corrugations in azimuth about the longitudinal axis X which create, on the side of the primary flow under the high points 134 of the trailing edge 120, divergent lobes (called hot lobes and referenced 134 for simplification), and create, on the side of the secondary flow above the low points 132 of the trailing edge 120, convergent lobes (called cold lobes and referenced 132 for simplification).

In the example presented, the abscissa $x_p$, on the longitudinal axis X which determines the maximum extension of the downstream lobed mixer 6 corresponds to the high points of the hot lobes (FIG. 3). Through the abscissa $x_p$ passes an ejection plane, i.e. a plane from which the air flow is ejected from the hot lobes. This exemplary embodiment of a mixer includes eighteen symmetrical hot lobes about the axial plane passing through their middle and distributed periodically.

In another embodiment of the invention, it is possible to envisage defining a lobed mixer 130 by modifying its axial extension, the penetration rate of the lobes (essentially determined by the radii of the high 134 and low 132 points of the trailing edge 120), the shape of this trailing edge 120, as well as the number of lobes. The lobes may also not have axial planes of symmetry. Likewise, although the distribution of the lobes is essentially periodic, this periodicity can be locally affected by modifying the shape of some lobes, for example to adapt the mixer 130 to a pylon passage.

The lobed mixer 130 promotes the mixing of the primary Vp and secondary Vs flows in the flowpath inside the secondary nozzle 110, in particular by causing shears and vortices at the interface between the flows.

Now that the general context has been described, the means of the invention will be explained in relation to FIGS. 3 to 6.

The secondary nozzle 110 comprises, along its inner circumference, at the throat 112, a periodic succession of lobes radially outwardly 118 radially inwardly 116. In other words, a periodic succession of lobes 116, 118 is provided on the inner circumference of the secondary nozzle 110. The succession comprises alternation of convex 116 and concave 118 lobes. This allows locally increasing and decreasing the radius of the throat 112 of the secondary nozzle 110 in particular, to allow better distribution of the heat coming out of the hot lobes. Particularly, this allows keeping the air flow which passes through the Mach pocket(s) located at the throat 112, in the vicinity of the inner wall of the nozzle 110. It is therefore a passive system.

The maximum radius of the secondary nozzle 110 at the throat 112 remains however smaller than the radius of the secondary nozzle 110 at the trailing edge.

The lobes 116, 118 are preferably located over the entire inner circumference of the nozzle 110. However, it is possible that, for design reasons (rotational asymmetry, arm passage), some portions of the circumference may be devoid of lobes 116, 118.

The terms "convex" and "concave" mean "globally convex" and "globally concave", that is to say a lobe (which is a rounded portion) in which the material extends radially inwardly and a lobe in which the material is recessed radially outwardly. There may be locally a convexity in the concavity. In other words and more generally, the nozzle has at the throat a non-circular section, having an alternation of lobes so that the radius of the section varies in a regular manner.

In one particular embodiment, the definitions of "convex" and "concave" can be strict, in the sense that the convex lobes are defined by a convex curve (therefore without inflection) and that the concave lobes are defined by a concave curve (therefore without inflection). This will then be referred to as "strictly convex" and "strictly concave".

In one embodiment, it is possible to have strictly concave lobes and convex lobes, according to the definitions explained above.

Compared to a conventional nozzle, whose sections which are orthogonal to the longitudinal axis X are circular, the area of the nozzle at the throat 112 preferably remains unchanged. This implies that, from an axisymmetric reference nozzle, of radius $R_{ref}$ at the abscissa $x_{throat}$ corresponding to the throat 112, the concave lobes 118 extend radially outside the circular reference section and the convex lobes 116 extend radially inside the circular reference section (see FIGS. 5 and 6—on the latter, $R_{ref}$ refers to the circumference of the circular reference section).

The lobes 116, 118 of the secondary nozzle 110 are positioned circumferentially based on the cold 132 and hot 134 lobes of the mixer 130. Particularly, the concave lobes 118 are positioned radially facing, the hot lobes 134, to within the longitudinal offset. Preferably, for obvious reasons of symmetry, the apexes of the lobes of a concave/hot or convex/cold pair of lobes are radially aligned (i.e. in an orthogonal section, the longitudinal axis and the two apexes are aligned).

Preferably, the sequence between a concave lobe 118 and a convex lobe 116 takes place in the radial alignment of the sequence between a hot lobe 134 and a cold lobe 132.

For reasons of efficiency, in one embodiment, there are as many concave lobes 118 as there are hot lobes 134. In one complementary or alternative embodiment, there are as many convex lobes 118 as there are cold lobes 132. The numbers may not match in some specific cases where constraints make it necessary to remove a concave or convex lobe (actuator, etc.).

The lobes 116, 118 also extend longitudinally in the secondary nozzle 110 by a certain distance D from the throat, so as to generate aerodynamic shapes, whether upstream, and/or downstream of the throat 112.

For this purpose, amplitudes of the convex 116 and concave 118 lobes are preferred between several sections orthogonal to the successive longitudinal axis X which gradually decrease until reaching zero, upstream and downstream of the throat 112. This can mean in particular that the section of the nozzle becomes generally circular again. The decrease in the amplitude of the lobes is both in absolute mode (the lobes outside the throat 112 have one amplitude smaller than that at the throat 112) and in relative mode (the amplitude of the lobe with respect to the diameter is greater at the throat than elsewhere).

Preferably, the lobes 116, 118 are longitudinally centered on the throat 112 and therefore extend longitudinally upstream and downstream.

In one embodiment, the lobes 116, 118 extend to the trailing edge 114, with one amplitude decreasing progressively so that the section of the trailing edge 114 is circular.

The distance D can depend on various parameters, such as in particular the distance between the trailing edge 114 and the throat 112. However, the distance between the throat 112 and one of the ends of the lobe 116, 118 is preferably smaller than once the diameter of the secondary nozzle 110 at the throat 112.

In one particular embodiment adapted to a periodic 130, the lobes define a sinusoid verifying the following equation;

$$R(x,\theta)=R_{ref}(x)+L(x)\cdot\cos(N\cdot\theta)$$

where R is the radius of the nozzle as a function of the circumferential position and of the abscissa along the longitudinal axis of the nozzle, $x_{throat}$ is the abscissa of the throat, $R_{ref}$ is the radius of the circular reference section, L is an amplitude function depending on the abscissa x, and N is the number of periods, that is to say the number of desired convex 116 or concave 118 lobes.

As the area of the section of the nozzle 110 at the abscissa $x_{throat}$ is desired to be identical to that of the reference nozzle, the lobes also verify the following equation:

$$\pi R^2_{ref}(x_{throat})=\pi\int_0^{2\pi}R^2(x_{throat},\theta)d\theta$$

The function L determines the progression of the lobes according to the abscissa. In one embodiment, a Gaussian function is used.

In this embodiment, there are therefore strictly convex and strictly concave lobes, centered longitudinally about the throat 112. The shape of the lobes of the nozzle 110 can locally depart from the given formula to allow the passage of a pylon or a structural shaft. Thus, the formula can be applied for lobes on a portion of the inner circumference. This portion then extends at least over 50%, even 75% of the total inner circumference. In the absence of any particular structure which disrupts the application of the formula, the entire circumference can be defined in this way.

The lobes 116, 118 are preferably formed directly in the material of the nozzle, either during the foundry, or by subsequent deformation. It can be envisaged to create the convex lobes 116 by adding material subsequently to the manufacture of the secondary nozzle 110.

This modified nozzle has a limited or even zero mass impact. Being passive, the risk of failure is also limited, even equal to zero, and it consumes no additional resources. In addition, it does not reduce the treatment surface for known acoustic treatments (disposed within the thickness of the secondary nozzle). Finally, this modified nozzle involves practically no constraint on the architecture of the conventional convergent-divergent nozzles.

An increase in the temperature locally by 50° K. allows for example lowering the Mach between 0.90 and 0.95, compared to a Mach of 1 for a temperature of 320° K.

The deformed nozzle 110 allows saving up to 1 EPNdB cumulatively.

The invention claimed is:

1. An assembly for a rear of a turbomachine with a longitudinal axis, the assembly comprising:
    a primary nozzle comprising a trailing edge and defining a primary flowpath portion,
    a secondary nozzle defining a secondary flowpath portion, said secondary nozzle being configured to eject a mixture of flows derived from a secondary flowpath and a primary flowpath of the turbomachine, the secondary nozzle being of convergent-divergent shape with a throat corresponding to a minimum section of the secondary nozzle,
    a lobed mixer, at a downstream end of the primary nozzle and having an alternation of hot lobes extending inside the secondary flowpath and cold lobes extending inside the primary flowpath,
    wherein:
    the secondary nozzle comprises, at the throat, a periodic succession of convex and concave lobes located along an inner circumference of the secondary nozzle, and
    the lobes of the secondary nozzle are, to within a longitudinal offset, radially facing the hot lobes and the cold lobes of the lobed mixer,
    and there are as many concave lobes as there are the hot lobes and as many convex lobes as there are the cold lobes.

2. The assembly according to claim 1, wherein each of the lobes of the secondary nozzle extends axially over part of the secondary nozzle by a certain distance from the throat to a trailing edge of the secondary nozzle.

3. The assembly according to claim 2, wherein the certain distance is smaller than an average diameter of the secondary nozzle at the throat.

4. The assembly according to claim 3, wherein, in sections orthogonal to the longitudinal axis, an amplitude of the lobes of the secondary nozzle between successive sections along an upstream and/or downstream direction of the throat gradually decreases until reaching zero.

5. The assembly according to claim 2, wherein, in sections orthogonal to the longitudinal axis, an amplitude of the lobes of the secondary nozzle between successive sections along an upstream and/or downstream direction of the throat gradually decreases until reaching zero.

6. The assembly according to claim 1, wherein the lobes of the secondary nozzle are formed directly in a material of the secondary nozzle.

7. The assembly according to claim 1, wherein a ratio between a section at a trailing edge of the secondary nozzle and a section at the throat of the secondary nozzle is comprised between 1 and 1.05.

8. The assembly according to claim 1, wherein a section of a trailing edge of the secondary nozzle is circular.

9. A double-flow turbomachine comprising the assembly according to claim 8.

10. The assembly according to claim 1, wherein the periodic succession of the lobes of the secondary nozzle is defined, at least on a portion of the inner circumference of the secondary nozzle, by the following equation:

$$R(x,\theta)=R_{ref}(x)+L(x)\cdot\cos(N\cdot\theta)$$

and $$\pi R^2_{ref}(x_{throat})=\pi\int_0^{2\pi} R_2(x_{throat},\theta)d\theta$$

where R is a radius of the secondary nozzle as a function of a circumferential position and of an abscissa along the longitudinal axis of the turbomachine, $x_{throat}$ is an abscissa of the throat, $R_{ref}$ is a radius of a circular reference section, L is an amplitude function depending on the abscissa of the throat, N is a number of periods.

11. The assembly according to claim 10, wherein the periodic succession of the lobes of the secondary nozzle is defined on more than 75% of the inner circumference of the secondary nozzle.

* * * * *